April 21, 1925.
J. B. FICKES
1,534,171
DENTAL FLOSS GUIDING MEANS
Filed Aug. 13, 1923
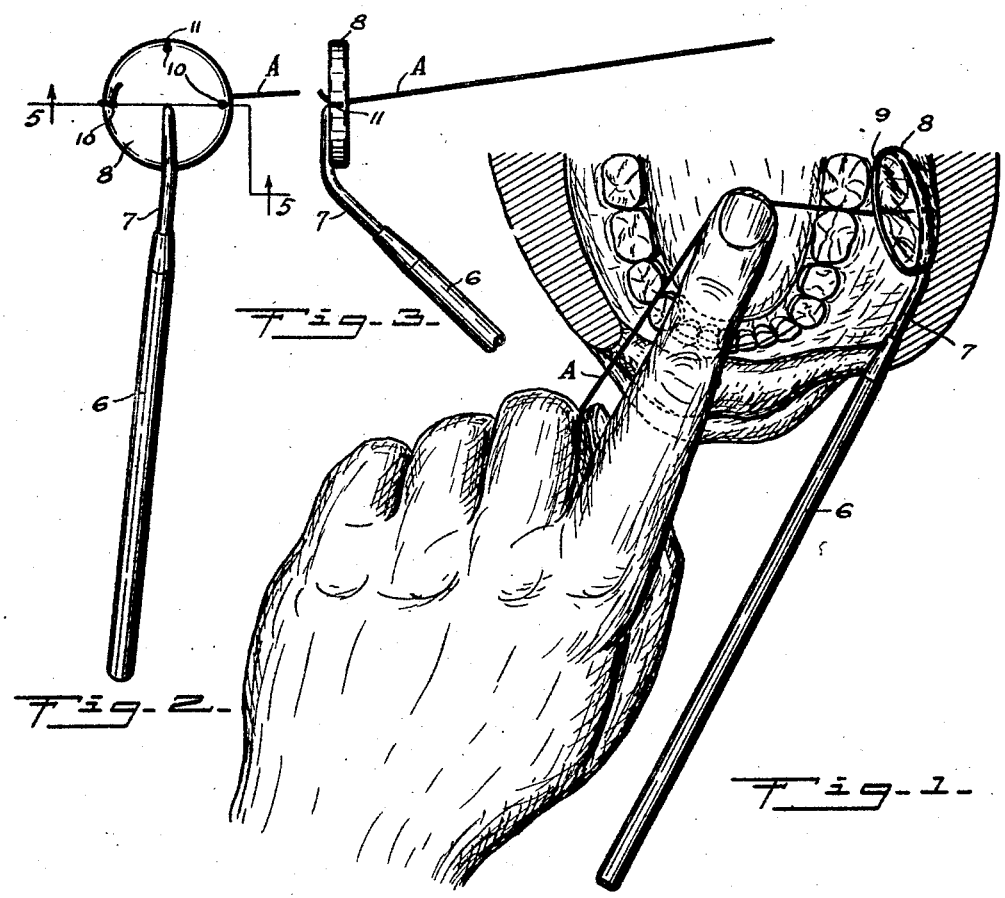
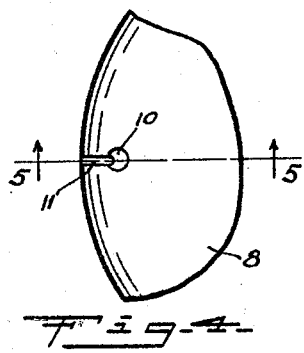
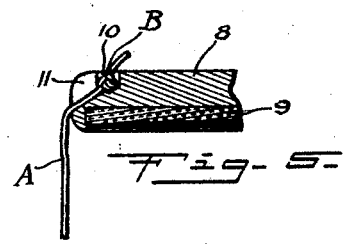
Inventor:
J. B. FICKES.
By David O. Barnell
Attorney.
Witness:
R. J. Honomichl.

Patented Apr. 21, 1925.

1,534,171

UNITED STATES PATENT OFFICE.

JOSIAH B. FICKES, OF OMAHA, NEBRASKA.

DENTAL-FLOSS-GUIDING MEANS.

Application filed August 13, 1923. Serial No. 657,036.

*To all whom it may concern:*

Be it known that I, JOSIAH B. FICKES, a citizen of the United States, and a resident of Omaha, in the county of Douglas and State of Nebraska, have invented certain new and useful Improvements in Dental-Floss-Guiding Means, of which the following is a specification.

My invention relates to instruments and devices for cleansing the teeth, and particularly to instruments for facilitating the insertion of dental floss between the teeth to scour the proximal surfaces thereof and to dislodge materials adherent thereto or wedged in the inter-tooth spaces. It is the object of my invention to provide for the purposes stated a simple, inexpensive and practical instrument by which the user may view any portion of the mouth to locate any foreign substance or material between the teeth and at the same time hold one end of a thread or strand of dental floss so as to guide the same between the teeth. It is generally agreed that the preferred method of cleansing the inter-tooth spaces and proximal surfaces of the teeth is by the use of dental floss, and dentists as a rule employ the same and recommend the use thereof to their patients. The use of dental floss has been greatly limited, however, by the difficulty which most persons have in introducing the floss between their teeth while holding the floss with the fingers, due to the fact that the hands so obstruct the vision that the guiding of the floss into the desired space must be effected principally by the sense of touch alone. My invention provides a means by which a person, while standing in front of an ordinary mirror and with a source of light so disposed as to illuminate the mouth cavity, may readily observe any of the teeth or the inter-tooth spaces while guiding into said spaces a thread or strand of dental floss.

In the accompanying drawings Fig. 1 is a horizontal section through the mouth of a person, showing in use an instrument embodying my invention, Fig. 2 is a rear view of the mirror frame, Fig. 3 is a detail edge view of the same, Fig. 4 is an enlarged detail rear view of a portion of the mirror frame, and Fig. 5 is a detail transverse section on the line 5—5 of Fig. 4.

In carrying out my invention I employ a dental or mouth mirror of substantially the form commonly used for viewing portions of the mouth, particularly those surfaces of the teeth which cannot be directly observed from the front. In the structure shown the instrument comprises a straight cylindrical handle 6 having at one end a shank 7 which extends to the mirror-frame or holder 8. The latter comprises a circular disk of metal which is recessed at one side to receive the mirror 9, and is arranged to lie in a plane diagonal to the handle 6 and the main portion of the shank 7, said shank being bent to the desired angle at the juncture of said main portion with the end portion which is secured to the back of the holder 8. In the rear side of the holder 8, adjacent to the edges thereof, are a plurality of small cylindrical openings or recesses 10, from which narrow slots 11 are extended outwardly to the edges of the disk. The slots 11 are of such width as to receive a single thread or strand A of dental floss, and the openings 10 are of such size as to receive a knot B tied in such strand or thread.

In the use of the instrument the knot B is tied in the thread or strand near one end thereof, said knot is inserted in one of the recesses 10, and the thread is passed through the respective slot 11 to the outer edge of the holder. The knotted end of the thread is thus connected with the mirror frame so as to be securely held while a tension is exerted upon the thread in a lateral or forward direction, but so as to be readily detachable by pulling the thread rearwardly. The attached end of the thread A is carried into the mouth with the mirror when the same is inserted for viewing the teeth and locating the space into which the thread is to be inserted. As the thread may be secured to the holder 8 at any one of a plurality of points, by a suitable selection of the point of attachment the thread may be held in position to enter the desired space at the same time that a clear view thereof is obtained in the mirror. In Fig. 1 there is clearly shown a typical use of the instrument, and therefrom the manipulation and manner of holding the floss while introducing the same between the teeth will be readily apparent. After the insertion of the floss has been effected, the same is employed in the usual way for cleansing the surfaces, by drawing the thread back and forth or moving the same up and down while it is firmly held against the tooth.

Now, having described my invention, what I claim and desire to secure by Letters Patent is:

1. In an instrument of the class described, a mirror-frame having at a plurality of points on the marginal portion thereof means for detachably connecting therewith a thread or strand of dental floss, and a mirror held in said frame.

2. In an instrument of the class described, a mirror, an inclosing metal frame for the rear side thereof, said frame having in the rear side thereof a knot-receiving recess and a thread-receiving slot extending from said recess to the edge of the frame, and a suitable handle on which said frame is carried.

3. In an instrument of the class described, a suitable handle, a circular mirror-frame carried on said handle, a mirror held in said frame and a plurality of thread-holding means spaced marginally about said frame, said thread-holding means each comprising a knot-receiving recess and a thread-receiving slot extending from said recess to the edge of the frame.

J. B. FICKES.